United States Patent
Khosla et al.

(10) Patent No.: US 8,396,249 B1
(45) Date of Patent: Mar. 12, 2013

(54) ROBOT CONTROL BASED ON SALIENCY AND INVARIANT SPATIAL REPRESENTATIONS USING HIERARCHICAL SPATIAL WORKING MEMORY

(75) Inventors: Deepak Khosla, Camarillo, CA (US); Paul Alex Dow, Los Angeles, CA (US); David Huber, Venice, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1113 days.

(21) Appl. No.: 12/342,643

(22) Filed: Dec. 23, 2008

(51) Int. Cl.
*G06K 9/00* (2006.01)
(52) U.S. Cl. .......................... 382/103; 382/153; 382/154
(58) Field of Classification Search .................. None
See application file for complete search history.

(56) References Cited

U.S. PATENT DOCUMENTS

| | | | | |
|---|---|---|---|---|
| 6,359,601 | B1 * | 3/2002 | Maguire, Jr. | 345/7 |
| 8,311,317 | B1 * | 11/2012 | Dow et al. | 382/153 |
| 2002/0105484 | A1 * | 8/2002 | Navab et al. | 345/8 |
| 2009/0018696 | A1 * | 1/2009 | Goerick et al. | 700/245 |
| 2009/0175595 | A1 * | 7/2009 | Le Meur et al. | 386/96 |

OTHER PUBLICATIONS

Khosla et al. (2009) "Biologically inspired robust and adaptive multi-sensor fusion and active control." Proc. SPIE vol. 7345.*
Khosla et al. (2009) "3d hierarchical spatial representation and memory of multimodal sensory data." Proc. SPIE vol. 7345.*
Asfour et al. (Dec. 2006) "ARMAR-III: An integrated humanoid platform for sensory-motor control." Proc. 6th IEEE-RAS Int'l Conf. on Humanoid Robots, pp. 169-175.*
Huber et al. (2009) "Fusion of multi-sensory saliency maps for automated perception and control." Proc. SPIE vol. 7336.*
Kayser et al. (Nov. 2005) "Mechanisms for allocating auditory attention: An auditory saliency map." Current Biology, vol. 15 pp. 1943-1947.*
Liu et al. (Oct. 2006) "A spatiotemporal saliency framework." Proc. 2006 IEEE Int'l Conf. on Image Processing, pp. 437-440.*
Pouget et al. (2002) "Multisensory spatial representations in eye-centered coordinates for reaching." Cognition, vol. 83 pp. B1-B11.*
Soueres et al. (Aug. 2007) "Robotics insights for the modeling of visually guided hand movements in primates." LNCIS vol. 357, pp. 53-75.*
Tatler et al. (2005) "Visual correlates of fixation selection: effects of scale and time." Vision Research, vol. 45 pp. 643-659.*
Tuan et al. (Dec. 2009) "Eye-centered vs body-centered reaching control: A robotics insight into the neuroscience debate." Proc. 2009 IEEE Int'l Conf. on Robotics and Biomimetics, pp. 568-573.*
Cameron, S. A. 1996. Self-organizing neural networks for visual navigation and adaptive control. Boston University.
Edsinger, A. 2007. Robot Manipulation in Human Environments. Massachusetts Institute of Technology. http://dspace.mit.edu/handle/1721.1/35727.

(Continued)

*Primary Examiner* — Barry Drennan
(74) *Attorney, Agent, or Firm* — George R. Rapacki; Daniel R. Allemeier

(57) ABSTRACT

A method and apparatus for controlling robots based on prioritized targets extracted from fused visual and auditory saliency maps. The fused visual and auditory saliency map may extend beyond the immediate visual range of the robot yet the methods herein allow the robot to maintain an awareness of targets outside the immediate visual range. The fused saliency map may be derived in a bottom-up or top-down approach and may be feature based or object based.

18 Claims, 11 Drawing Sheets

Hierarchical Spatial Working Memory.

OTHER PUBLICATIONS

Greve, D., S. Grossberg, F. Guenther, and D. Bullock. 1993. Neural representations for sensory-motor control, I: Head-centered 3-D target positions from opponent eye commands: Acta Psychol (Amst) 82, No. 1-3: 115-38.

Grossberg, S., F. Guenther, D. Bullock, and D. Greve. 1993. Neural representations for sensory-motor control, II: learning a head-centered visuomotor representation of 3-D target position. Neural Networks 6, No. 1: 43-67.

Guenther, F., D. Bullock, D. Greve, and S. Grossberg. 1994. Neural Representations for Sensory-Motor Control, III: Learning a Body-Centered Representa tion of a Three-Dimensional Target Position. Journal of Cognitive Neuroscience 6, No. 4: 341-358.

Peters, R. A., K. A. Hambuchen, K. Kawamura, and D. M. Wilkes. 2001. The Sensory EgoSphere as a Short-Term Memory for Humanoids. Proc. of the IEEE-RAS Int'l Conf. on Humanoid Robots:22-24.

Shibata T., S. Vijayakumar, J. Conradt, and S. Schaal. 2001. Biomimetic oculomotor control. Adaptive Behavior 9, No. 3/4: 189-208.

Tweed, D. 1997. Three-Dimensional Model of the Human Eye-Head Saccadic System. Journal of Neurophysiology 77, No. 2: 654-666.

Vijayakumar, S., A. D'souza, T. Shibata, J. Conradt, and S. Schaal. 2002. Statistical Learning for Humanoid Robots. Autonomous Robots 12, No. 1: 55-69.

Itti, L and C. Koch. A saliency-based search mechanism for overt and covert shifts of visual attention. Vision Research, 40: 1489-1506, 2000.

Itti, L., C. Koch, and E. Niebur. A Model of Saliency-Based Visual Attention for Rapid Scene Analysis. IEEE Transactions on Pattern Analysis and Machine Intelligence, 20, 1254-1259, 1998.

Navalpakkam, V., and L. Itti. An integrated model of top-down and bottom-up attention for optimal object detection, In: Proc. IEEE Conference on Computer Vision and Pattern Recognition (CVPR), 1-7, 2006.

Orabona, E., G. Metta, and G. Sandini. Object-based Visual Attention: A Model for a Behaving Robot. In 3rd International Workshop on Attention and Performance in Computational Vision (in CVPR 2005), San Diego, CA, Jun. 2005.

Zhong, J. and Luo, S. (2006) A Model of Space and Object-based Attention for Visual Saliency. Proceedings of the First International Conference on Innovative Computing, Information, and Control (ICICIC '06).

Khosla, D. , C. Moore, D. Huber, S. Chelian. Bio-inspired visual attention and object recognition, Proc. SPIE 6560, 2007.

Kayser, Christoph, Christopher I. Petkov, Michael Lippert, and Nikos K. Logothetis, Mechanisms for Allocating Auditory Attention: An Auditory Saliency Map, Current Biology, vol. 15, 1943-1947, 2005.

Strutt, J. W. ,On Our Perception of Sound Direction, Phil. Mag, vol. 13, 214-232, 1907.

Zurek, P.M., A Note on Onset Effects in Binaural Hearing. J Acoust Soc. Am., vol. 93(2), 1200-1201, 1993.

Martin, K.D., A Computational Model of Spatial Hearing, Master's Thesis, Massachusetts Institute of Technology, 1995.

Ruesch, Jonas , Manuel Lopes, Alexandre Bernardino, Honas Homstein, Jose Santos-Victor, Rolf Pfeifer. Multimodal Saliency Based Bottom Up Attention a Framework for the Humanoid Robot iCub, IEEE International Conference on Robotics and Automation, Pasadena, CA. USA, May 19-23, 2008.

\* cited by examiner

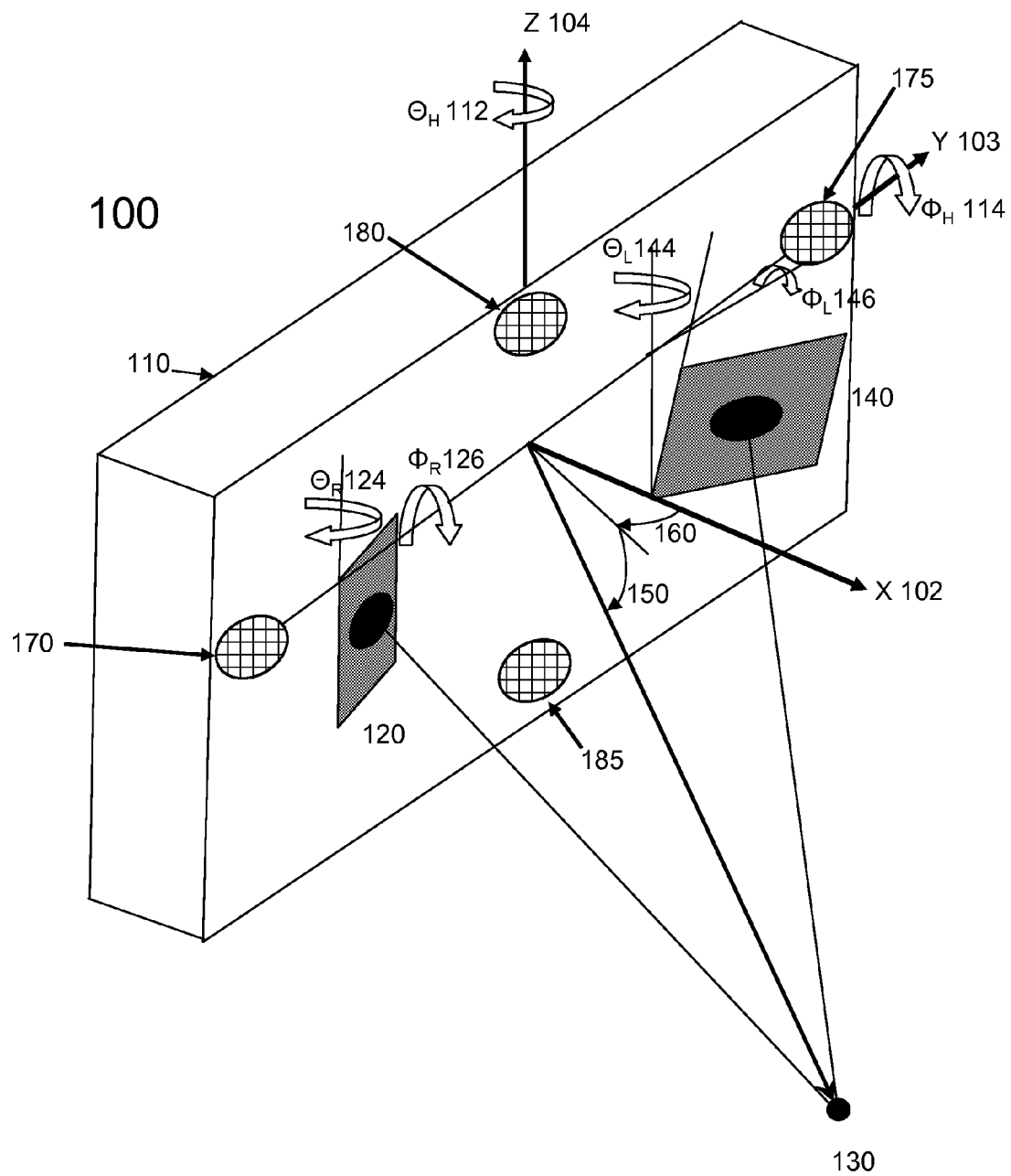
FIG. 1 Robot Eyes, Head and Body Relationships

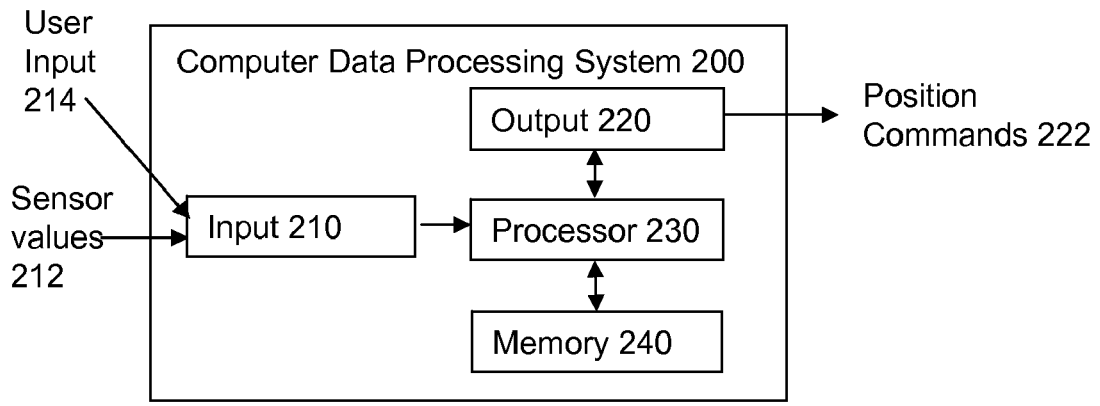
FIG. 2 Robot Computer
FIG. 3 Robot System
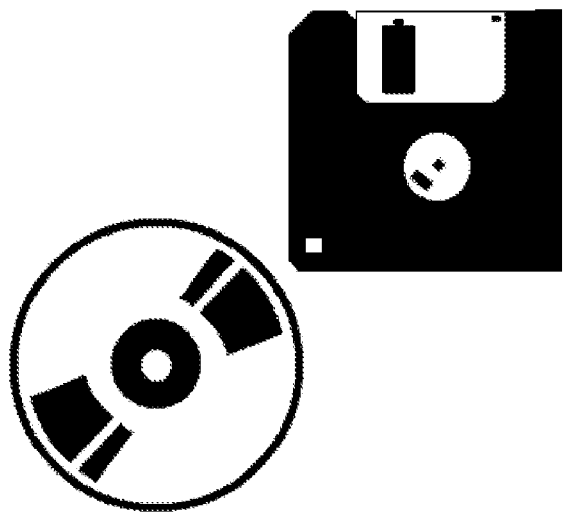
FIG. 4 Computer Program Product on Compact Disk or other medium

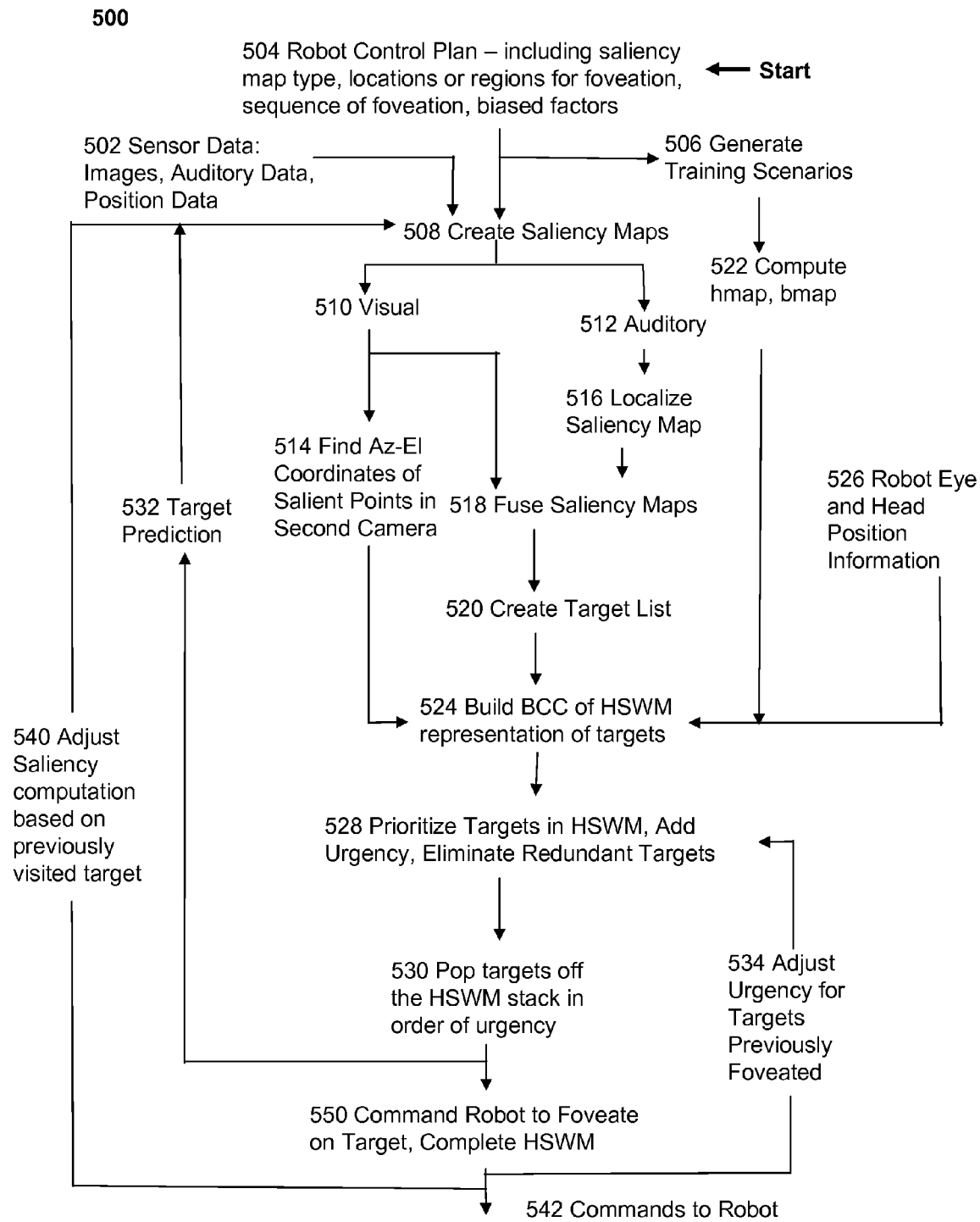
FIG. 5A Overview of Robot Control

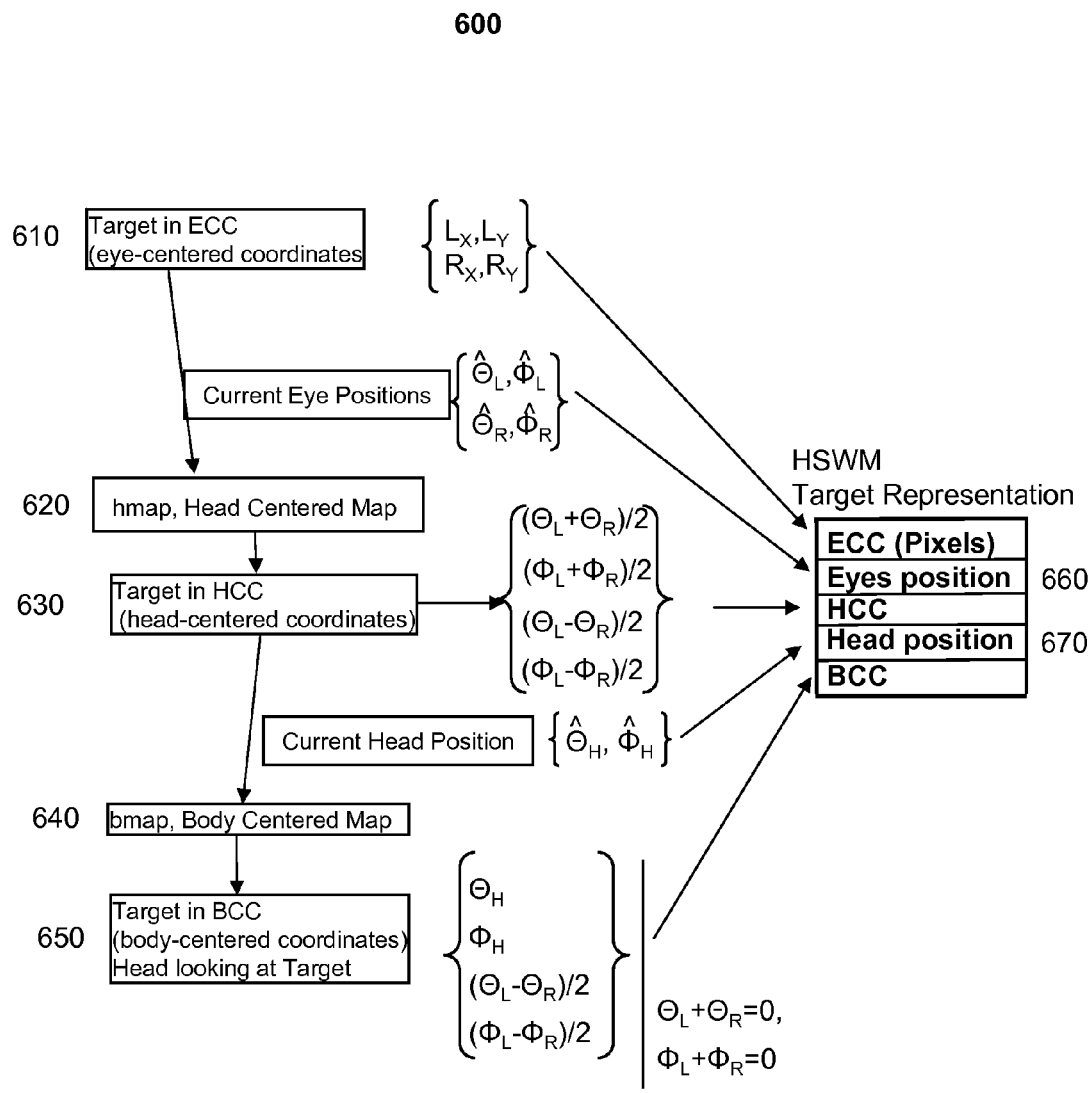
FIG. 6: Hierarchical Spatial Working Memory.

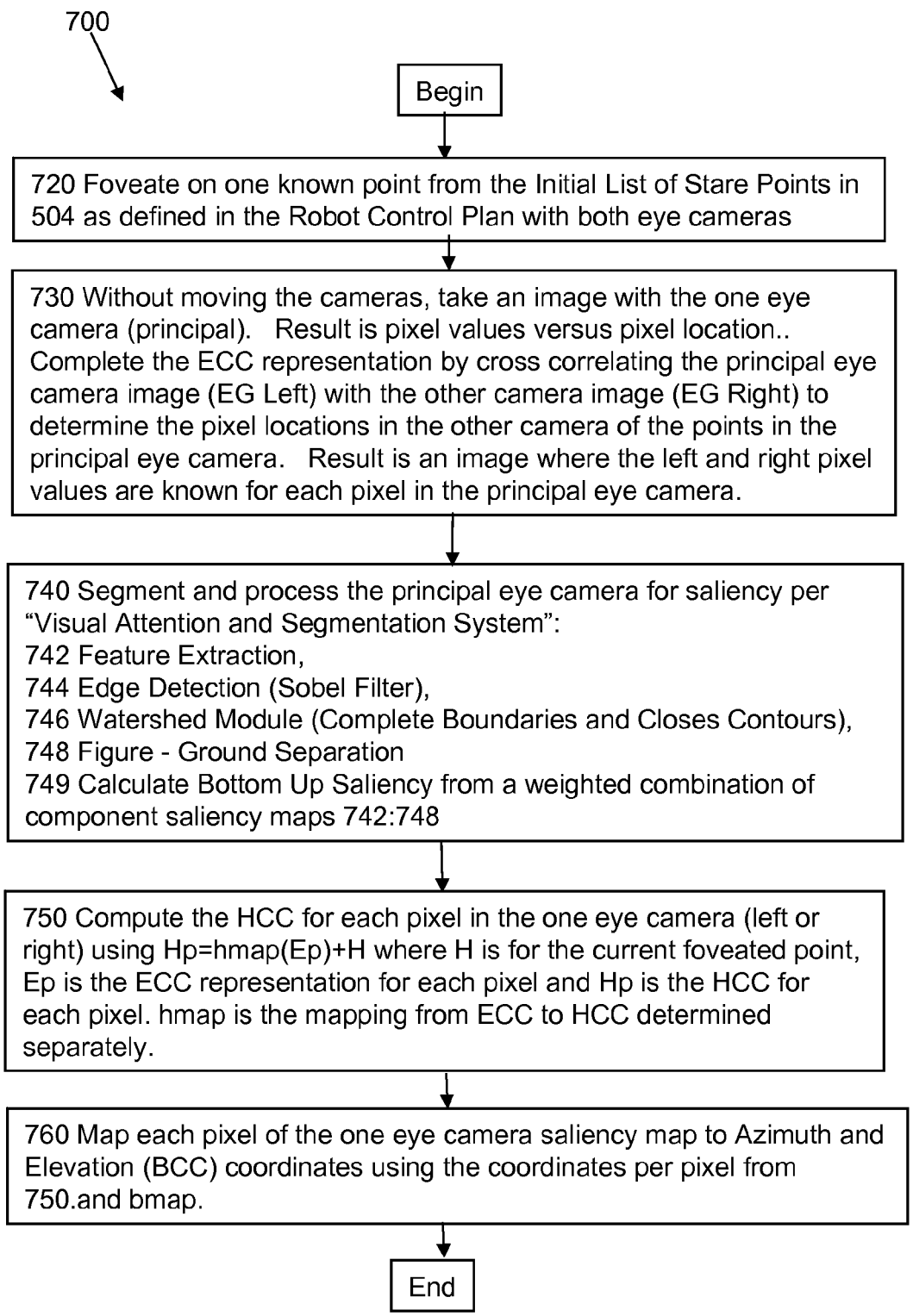
FIG. 7 Creation of Visual Saliency Map

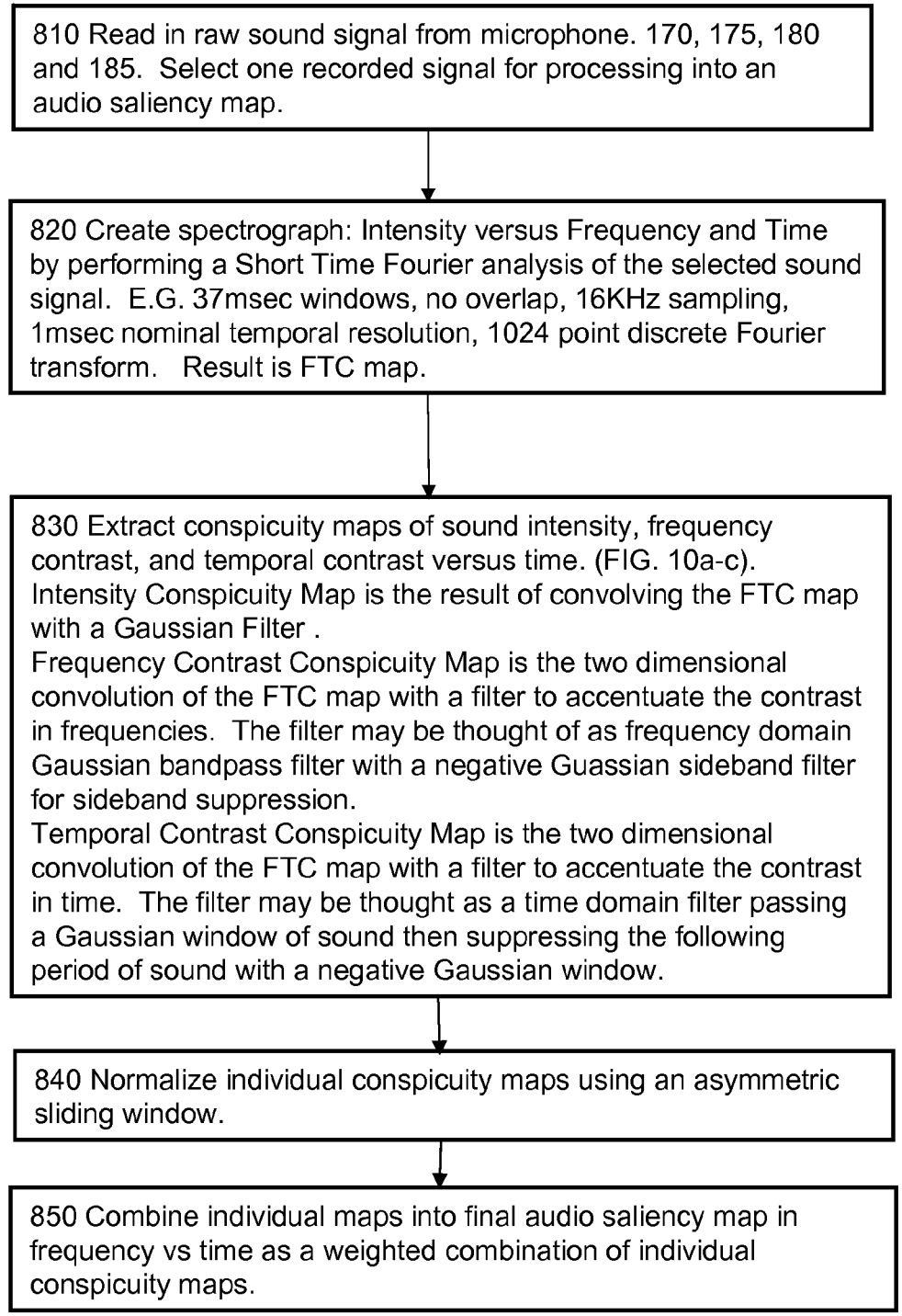
FIG. 8 Creation of Audio Saliency Map

| 504 Robot Control Plan Contents |
| --- |
| Initial Robot Configuration Parameters |
| Training Scenarios |
| Saliency Plan: Feature Based, Object Based or Other Type of Saliency |
| Initial List of Stare Points |
| Weighting Factors for Fusing Various Saliency Maps |
| Visual (Object Based) Saliency Filter Parameters (Conspicuity, Sobel, Watershed) |
| Weighting Factors for Feature based Saliency |
| Weighting Factors for Object Based Saliency |
| Auditory Saliency Data Sampling Parameters |
| Auditory Saliency Short Term Fourier Analysis Parameters |
| Auditory Saliency Noise and Echo Elimination Parameters |
| Auditory Saliency Gaussian Dimensions |
| Weighting Factors for Auditory Saliency |
| Auditory Localization Parameters (Windowing, Filter, Major Peak Parameters) |
| Thresholds for comparisons, cross correlations |
| Maximum Number of Salient Points in Prioritized Target List 528 |
| Hi vs Low Saliency Parameters and Urgency Adjustments |
| List of Objects to be Considered Targets |
| List of Objects to be Ignored |
| Optional Adjust Saliency Map Computation step 540 |
| Optional Use Target Prediction Feedback step 532 |
| Optional Urgency Adjustment step 534 |

FIG. 9

| Visual Saliency Options and Characteristics |||
| --- | --- | --- |
| | Feature Based | Object Based |
| Bottom Up | Features defined a priori. EG colors, orientation, intensity. Default weights on features | Feature based plus sobel, watershed and other filters to emphasize characteristics of particular objects |
| Top Down | Training scenario to develop weights for features, filters and conspicuity maps ||

FIG. 10

1110 Segment the Audio Saliency map in time and frequency by windowing the local maxima with a rectangular window that bounds the spectra by a user defined amount. For each local maxima, generate time and frequency bands of interest bracketing signal peaks. i.e. each peak has a time bracket and a frequency bracket

1120 For each time band create audio snippets by extracting the audio signal within the time band from the Left, Right, Upper and Lower Audio signals. Decimate the Left, Right, Upper and Lower Audio Signals by bandpass filtering each audio signal in the frequency domain with the frequency band. Result is a snippet of audio for each microphone for each signal peak specific to the time and frequency band of the saliency map peaks.

1130 Process the snippets to eliminate echoes and noise

1140 For the Upper and Lower snippets, calculate the onset envelope of the signals over the start and stop times
The onset envelope bounds the audio snippets of each microphone.
Onsets occur where the audio signal exceeds the decayed local maxima.
Repeat for the Left and Right snippets.

1150 For each enveloped snippet, Upper and Lower, find and save the onsets of the envelope. Convert the onsets to weighted Kronecker delta functions starting at the minimum time. Inhibit the occurrence of a Kronecker delta function until at least 10 milliseconds have elapsed from the preceding Kronecker delta function. The result is a time series onset signal represented by weighted Kronecker delta functions for each microphone for each signal peak in the Audio Saliency Map. The weights are the changes in amplitude of the onset envelope of the audio signal at that time.

1160 Calculate the Azimuth Interaural Time Difference by cross correlating the Left and Right sets of onset signals. The largest value represents the sound source, the time of occurrence is the ITD.

( Continued on following page )

FIG. 11A Localization of Audio Sources

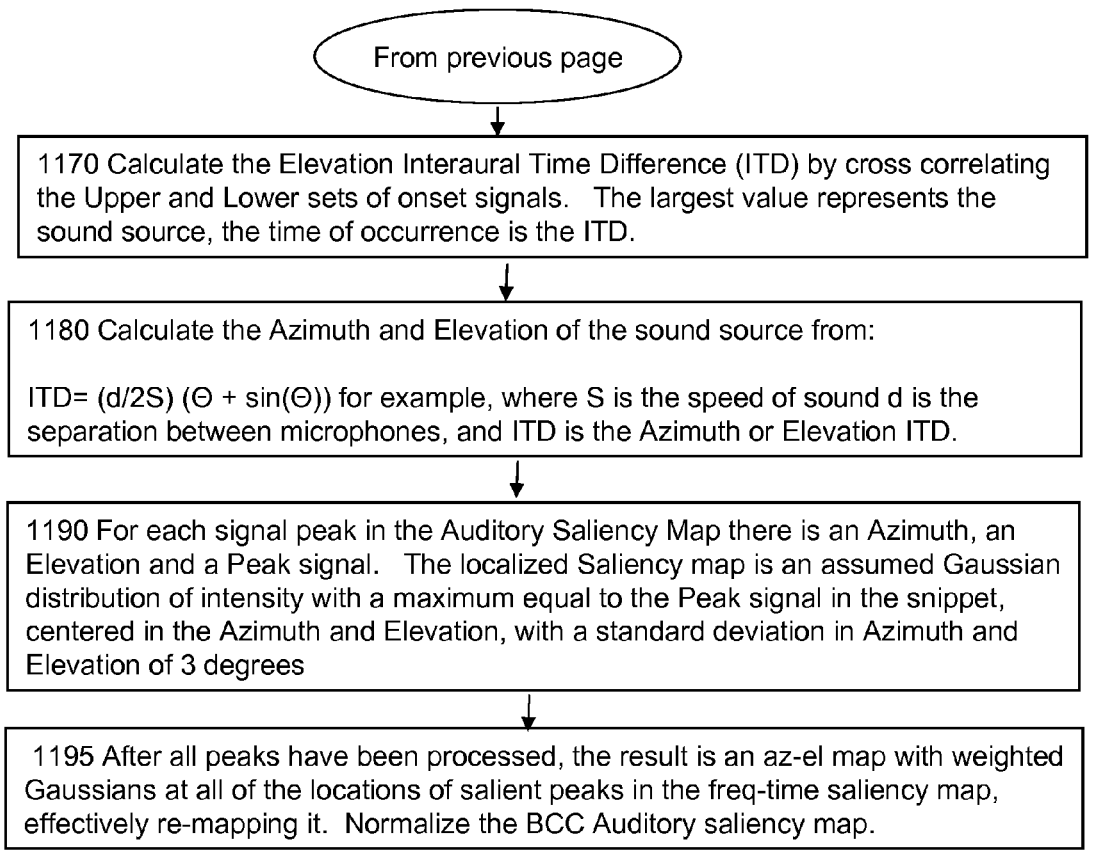
FIG. 11B Localization of Audio Sources (Concluded)
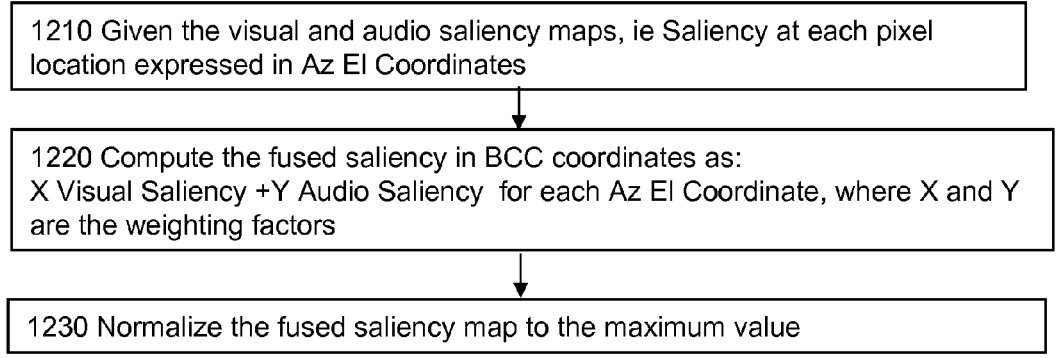
FIG. 12 Saliency Map Fusion

ROBOT CONTROL BASED ON SALIENCY AND INVARIANT SPATIAL REPRESENTATIONS USING HIERARCHICAL SPATIAL WORKING MEMORY

RELATED APPLICATIONS

This application is related to "Visual Attention and Object Recognition System" application Ser. No. 11/973,161 filed 4 Oct. 2007 (060907), Visual Attention and Segmentation System" application Ser. No. 12/214,259 filed 16 Jun. 2008 (061217), "Hierarchical Spatial Representation for Multimodal Sensory Data" application Ser. No. 12/192,918 filed Aug. 15, 2008 and "Fused Saliency Map from Multi-Modal Sensory Data" application Ser. No. 12/262,548 filed Oct. 10, 2008, herein incorporated by reference in their entirety.

BACKGROUND

Prior art has explored using bio-inspired models of human vision and other sensors for robot vision control. Other bio-inspired models of human vision have lead to robot control techniques that do not depend on classical negative feedback loops for control. Still separately, various methods have been proposed for translating an overall goal into specific robot control commands. These separate technologies have yet to be integrated into one overall method of robot control. There exists a need for control of a multimodal sensor robot responding to an overall plan or goal.

LIST OF CITED LITERATURE REFERENCES

The following references are hereby incorporated by reference as though fully included herein. The references are cited in the application by referring to the associated number.
1. Cameron, S. A. 1996. Self-organizing neural networks for visual navigation and adaptive control. Boston University.
2. Edsinger, A. 2007. Robot Manipulation in Human Environments. Massachusetts Institute of Technology. http://dspace.mit.edu/handle/1721.1/35727.
3. Greve, D., S. Grossberg, F. Guenther, and D. Bullock. 1993. Neural representations for sensory-motor control, I: Head-centered 3-D target positions from opponent eye commands. Acta Psychol (Amst) 82, no. 1-3: 115-38.
4. Grossberg, S., F. Guenther, D. Bullock, and D. Greve. 1993. Neural representations for sensory-motor control, II: learning a head-centered visuomotor representation of 3-D target position. Neural Networks 6, no. 1: 43-67.
5. Guenther, F., D. Bullock, D. Greve, and S. Grossberg. 1994. Neural Representations for Sensory-Motor Control, III: Learning a Body-Centered Representation of a Three-Dimensional Target Position. Journal of Cognitive Neuroscience 6, no. 4: 341-358.
6. Peters, R. A., K. A. Hambuchen, K. Kawamura, and D. M. Wilkes. 2001. The Sensory EgoSphere as a Short-Term Memory for Humanoids. Proc. of the IEEE-RAS Int'l Conf. on Humanoid Robots:22-24.
7. Shibata, T., S. Vijayakumar, J. Conradt, and S. Schaal. 2001. Biomimetic oculomotor control. Adaptive Behavior 9, no. 3/4: 189-208.
8. Tweed, D. 1997. Three-Dimensional Model of the Human Eye-Head Saccadic System. Journal of Neurophysiology 77, no. 2: 654-666.
9. Vijayakumar, S., A. D'souza, T. Shibata, J. Conradt, and S. Schaal. 2002. Statistical Learning for Humanoid Robots. Autonomous Robots 12, no. 1: 55-69.
10. L. Itti and C. Koch. A saliency-based search mechanism for overt and covert shifts of visual attention. Vision Research, 40: 1489-1506, 2000.
11. L. Itti, C. Koch, and E. Niebur. A Model of Saliency-Based Visual Attention for Rapid Scene Analysis. IEEE Transactions on Pattern Analysis and Machine Intelligence, 20, 1254-1259, 1998.
12. V. Navalpakkam, and L. Itti. An integrated model of top-down and bottom-up attention for optimal object detection, In: Proc. IEEE Conference on Computer Vision and Pattern Recognition (CVPR), 1-7, 2006.
13. E. Orabona, G. Metta, and G. Sandini. Object-based Visual Attention: A Model for a Behaving Robot. In $3^{rd}$ International Workshop on Attention and Performance in Computational Vision (in CVPR 2005), San Diego, Calif., June 2005.
14. Zhong, J. and Luo, S. (2006) A Model of Space and Object-based Attention for Visual Saliency. Proceedings of the First International Conference on Innovative Computing, Information, and Control (ICICIC '06).
15. D. Khosla, C. Moore, D. Huber, S. Chelian. Bio-inspired visual attention and object recognition, Proc. SPIE 6560, 2007.
16. Christoph Kayser, Christopher I. Petkov, Michael Lippert, and Nikos K. Logothetis, Mechanisms for Allocating Auditory Attention: An Auditory Saliency Map, Current Biology, Vol. 15, 1943-1947, 2005.
17. J. W. Strutt. On Our Perception of Sound Direction, Phil. Mag, Vol. 13, 214-232, 1907.
18. P. M. Zurek. A Note on Onset Effects in Binaural Hearing. J Acoust Soc. Am., Vol 93(2), 1200-1201, 1993.
19. K. D. Martin. A Computational Model of Spatial Hearing, Master's Thesis, Massachusetts Institute of Technology, 1995.
20. Jonas Ruesch, Manuel Lopes, Alexandre Bernardino, Honas Hornstein, Jose Santos-Victor, Rolf Pfeifer. Multimodal Saliency Based Bottom Up Attention A Framework for the Humanoid Robot iCub, IEEE International Conference on Robotics and Automation, Pasadena, Calif. USA, May 19-23, 2008.
21. U.S. patent application Ser. No. 12/262,548 filed Oct. 31, 2008 Fused Saliency Map from Multi-Modal Sensory Data.
22. U.S. patent application Ser. No. 12/192,918 filed Aug. 15, 2008 Hierarchical Spatial Representation for Multimodal Sensory Data. Inventors: Paul A. Dow, Deepak Khosla, David Huber.

SUMMARY

This invention describes a computer program product and method for directing a robot's sensors to focus on the most important or salient target in the sensors' field of view. The target importance is expressed by a plan or goal for the particular robot. The plan or goal is expressed in the saliency map used to identify targets. This plan is used to configure the saliency map derivation and saliency calculation. The saliency map reflects not only the plan but the various sensors available to the robot such as visual and auditory sensors. The visual saliency map may be derived bottom up, top down, feature based or object based. In addition, the weighting factors used in the visual saliency and auditory saliency maps may be supplied in the plan or the plan may contain training scenarios that learn the weighting factors. The information from various sensors are fused into a composite saliency map. While this fused saliency map and associated methods are useful for robot-based applications in a multi-sensory environment, the method and apparatus described herein further includes steps to integrate the saliency processing with a self learned open loop control method.

FIG. 5A shows an overview of the invention that controls a robot based on an overall plan or goal, the specific inputs to the saliency calculation, and target identification. In a first embodiment, a computer program product for controlling a robot comprising a computer-readable medium having computer program instructions stored therein for causing at least one computer to control the robot to acquire sensor data, compute one or more saliency maps based on a robot control plan, fuse the one or more saliency maps into one combined saliency map, create a list in hierarchical spatial working memory of one or more targets according to the robot control plan from the combined saliency map, prioritize the targets in the hierarchical spatial working memory according to the robot control plan; and finally commanding the robot to focus on the targets in order of priority.

In another embodiment, the saliency maps may be based on visual data and computed using feature based segmentation or object based segmentation. The auditory saliency map may be computed in body centered coordinates and sound sources may be localized. Furthermore, the saliency maps may be modified according to the robot control plan.

In another embodiment, a method for controlling a robot comprising receiving visual sensory data, auditory sensory data and a control plan for the robot; calculating a saliency map according to the control plan; computing a list of targets in Hierarchical Spatial Working Memory from the saliency map; prioritizing the list of targets according to the robot control plan and controlling the robot by commanding the robot to focus on the targets in order of priority.

In another embodiment, the previous embodiment where the saliency map may be calculated using feature based segmentation or object based segmentation of visual data according to a control plan. Furthermore, the saliency map may also be based on auditory data. The auditory saliency map may be calculated in body centered coordinates and the sound source localized using interaural time difference.

In another embodiment, a computer programmed to execute a process for controlling a robot where the process comprises receiving visual sensory data, auditory sensory data and a control plan for the robot; calculating a saliency map according to the control plan; computing a list of targets in Hierarchical Spatial Working Memory from the saliency map; prioritizing the list of targets according to the robot control plan and controlling the robot by commanding the robot to focus on the targets in order of priority.

In another embodiment, the previous embodiment where the saliency map may be calculated using feature based segmentation or object based segmentation of visual data according to a control plan. Furthermore, the saliency map may also be based on auditory data. The auditory saliency map may be calculated in body centered coordinates and the sound source localized using interaural time difference.

DESCRIPTION OF THE DRAWINGS

The objects, features and advantages of the invention will be apparent from the following detailed description of the preferred embodiment of the invention in conjunction with reference to the following drawings where:

FIG. 1 shows the basic geometry of the robot. This is not meant to be limiting of the apparatus and method herein but a representation for the reader that relates the detailed description under the heading Robot Description to a physical device for ease of understanding.

FIG. 2 illustrates the computer for controlling the robot and executing the methods defined by this application.

FIG. 3 illustrates the relationship between the computer 200, the robot 100 and the target 130

FIG. 4 illustrates a computer program product embodying the methods defined by this application and containing the means described herein.

FIG. 5A shows an overview of the methods herein.

FIG. 6 shows the details of the Hierarchical Spatial Working Memory as detailed in reference 22 "Hierarchical Spatial Representation for Multimodal Sensory Data"

FIG. 7 shows the steps in developing the visual saliency map.

FIG. 8 shows the steps in developing the auditory saliency map.

FIG. 9 shows the components of the robot control plan.

FIG. 10 shows the visual saliency calculation options and characteristics.

FIGS. 11 A&B shows the localization steps necessary to convert an auditory saliency map into azimuth-elevation coordinates.

FIG. 12 shows the method used to fuse the visual and auditory saliency maps.

DESCRIPTION

Figure 5B:
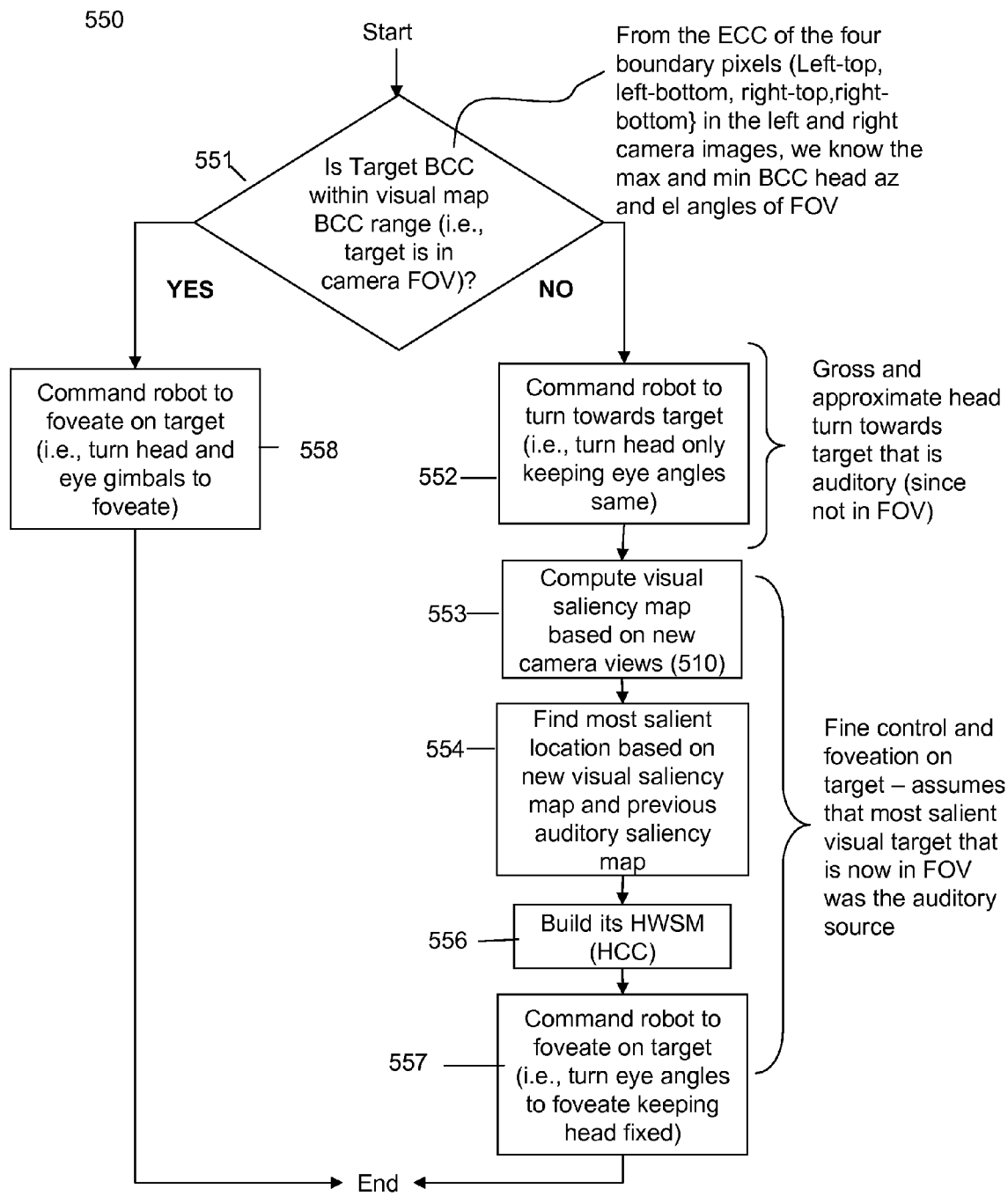
FIG. 5B shows the particulars of commanding the robot based on the fused saliency map.

This invention is directed to methods of robot control. In particular this invention is directed to integrating methods of processing sensor data into saliency maps, coupling the saliency information with a hierarchical spatial representation of targets then commanding the robot to address each target based on its urgency.

The following description is presented to enable one of ordinary skill in the art to make and use the invention and to incorporate it in the context of particular applications. Various modifications, as well as a variety of uses in different applications will be readily apparent to those skilled in the art, and general principles defined herein may be applied to a wide range of embodiments. Thus the invention is not intended to be limited to the embodiments presented, but is to be accorded the widest scope consistent with the principles and novel features disclosed herein.

All features disclosed in this specification, (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalents or similar features.

Any element in a claim that does not explicitly state "means for" performing a specified function, or "step for" performing a specific function, is not to be interpreted as a "means" or "step" clause as specified in 35USC Section 112, Paragraph 6. In particular, the use of step of or act of in the claims herein is not intended to invoke the provisions of 35USC Section 112 Paragraph 6.

The invention will be described with reference to the accompanying drawings. Further, the dimensions, materials and other elements shown in the accompanying drawings may be exaggerated to show details. The invention should not be construed as being limited to the dimensional or spatial relations or symmetry shown in the drawings, nor should the individual elements shown in the drawings be construed to be limited to the dimensions shown.

The drawings and accompanying descriptions are meant to provide the structure for the function performed by the components described in the drawings and accompanying descriptions.

GLOSSARY

BCC—body centered coordinates. The location of a target invariant to motions of the head or eyes bmap—mapping a position known in Head Centered Coordinates into Body Centered Coordinates.

ECC—eye centered coordinates, the pixel coordinates of a target in a camera's view.

Foveate—To center a target in the field of view of each camera by pointing the cameras at the target.

HCC—head centered coordinates. The location of a target invariant to motion of the eyes. The head pan and tilt angles needed to point the head at the target.

hmap—mapping a position in Eye Centered Coordinates into Head Centered Coordinates.

HSWM—Hierarchical Spatial Working Memory. The set of target position representations that include eye, head and body coordinates LWPR—Locally weighted projection regression. A method for learning the mapping between an input and an output.

Saliency Map—A saliency map captures the relative priority various objects detectable by a system should have to meet the overall goals of the system, all as a function of some coordinate system (not necessarily spatial). Depending on the goals of the system a bright object may be more salient than a dim one and a loud object more salient than a bright one. Other goals may require the "red" object to have a greater saliency than a loud object. In the literature a visual saliency map is composed of the combination of a number of feature maps. Each feature map depicts a set of items that can be used to satisfy a goal and the combination of feature maps explicitly implements a priority scheme of the importance of the various features. Combining the various feature maps generates a saliency map.

Somatosensory—information derived from touch sensors.

Target—item of interest in the field of view of the camera.

Verging—commanding the head and/or eyes such that the target is centered in each of two eyes. The vergence angle is the included angle between the gazes of each eye is a measure of the distance from the eyes to the target.

Robot Description 100

FIG. 1a illustrates the relationship between the eye cameras 120 and 140, the head 110, microphones 170, 175, 180 and 185 and the body represented by axes X 102, Y 103, and Z 104 of a typical robot 100.

The robot 100 is controlled by a computer 200 as shown in FIGS. 2 and 3. The structure, methods and programs implementing this invention can be embodied physically in many forms. FIG. 4 shows one non limiting example of a compact disk embodying programs for controlling the robot 100. Alternate embodiments include implementation in the memory of general purpose computers, flash drives, and memory accessible over a computer network. The computer that executes the methods and functions described in herein may be a general purpose computer with its own memory collocated with the robot or it may be a remote computer that interfaces with the robot and memory over communication links or the Internet. Another alternative embodiment of the computer is a special purpose computer built to execute the methods and functions herein.

If the computer 200 issues a command 222 to the robot 100 to achieve a particular joint angle or sensor position, then the robot will achieve that commanded position without error.

Eyes

The eyes of a robot are usually cameras but may be other sensors, e.g. millimeter wave imagers, RADAR, infrared imaging sensors. The eye cameras 120 & 140 generate pixels of the target 130 location in the field of view of the cameras 120 & 140. The target 130 location in the camera 120 & 140 frame can be represented as the horizontal and vertical pixel count. For purposes of this description but without implying a limitation of the present invention, a target 130 centered in the eye cameras 120 & 140 gives zero pixel counts. Each eye camera 120 & 140 can pan 124 & 144 and tilt 126 & 146, respectively, to point the eye camera 120 & 140 at the target 130. The pan 124 & 144 is the azimuth angle and the tilt 126 & 146 is the elevation angle. The pan and tilt angles 124, 144, 126, 146 may be sensor values or commands to achieve a desired pan or tilt angle.

A different camera system may give non zero pixel counts for targets centered in the field of view but that only implies a change of reference to calculate a zero-zero centered target.

Microphones

The ears of a robot are usually microphones. As shown in FIG. 1, microphones 170, 175, 180 and 185 may be arranged on the head such that pairs of microphone data may be processed into azimuth and elevation angles. The microphones measure sound intensity.

Head

The head 110 of a typical robot may have independently gimbaled and controlled eye cameras 120 & 140. The eye cameras 120 & 140 are mounted in a plane that defines the head such that when the pan and tilt angles of the eye cameras 120 & 140 are zero, each eye camera 120 & 140 is staring along a direction normal to the plane of the head. The head 110 itself may be gimbaled and controlled with respect to the body (102-104). The head may rotate in azimuth $\Theta_H$ 112 or pan and it may rotate in elevation or tilt $\Phi_H$ 114. The head pan and tilt angles 112, 114 may be sensor values or commands to achieve a desired pan or tilt angle 112, 114. When the head is pointing at the target a vector originating at the mid point between the eye cameras 120 & 140 and ending at the target is normal to the plane of the head 110.

Body

The body of the robot (represented by axes 102, 103 and 104) may be considered to be the part that the head 110 is mounted on. The body may be stationary or not. For example, if the eyes 120, 140 are surveillance cameras mounted in a room, then the room is the body and the head 110 is fixed.

Eye Centered Coordinates

The Eye Centered Coordinates (ECC) of a target is the primary input to the representation hierarchy. A target is identified, for example, as shown in "Visual Attention and Object Recognition System" (application Ser. No. 11/973,161 filed Oct. 4, 2007) in terms of its pixel location in a left and right eye camera image, $L_X$, $L_Y$, $R_X$, and $R_Y$ respectively. Without loss of generality, the pixel values are zero when a target is centered in the field of view of an eye. The x-y pixel coordinates in each image are combined to create a four-element vector, 610 in FIG. 6. This is a representation of the target location in eye-centered coordinates. In addition, the current pan and tilt angles of each eye are also saved as part of the Hierarchical Spatial Working Memory. As long as the system does not move, i.e. neither the eyes nor the head move, this is an accurate representation of the target location in space. As soon as either eye or the head moves, the prior pixel coordinates no longer correspond to the same location in space.

Head Centered Coordinates

The second level in the hierarchy is Head Centered Coordinates (HCC), which are based on the positions of the eye cameras 120 & 140 required for the target location to be centered in both eye cameras 120 & 140. This representation is invariant to eye position, because, regardless of the current positions of the eye cameras 120 & 140, the HCC tells one how they would be positioned if the target was centered in the eye cameras 120 & 140. Let $\Theta_L$ and $\Phi_L$ be the left eye camera 140 pan 144 and tilt 146, respectively, while the target is centered, $L_X, L_Y, R_X, R_Y$=0 and let $\Theta_R$ and $\Phi_R$ be the right eye camera 120 pan 124 and tilt 126, respectively. HCC is a four element vector: H=⟨$h_1, h_3, h_5, h_7$⟩. The elements $h_1$ and $h_3$ correspond to a head-centered, ego-centric pan 112 ($\Phi_H$) and tilt 114 ($\Phi_H$), respectively. They are computed as follows.

$$h_1 = \frac{\Theta_L + \Theta_R}{2} \qquad 1$$

$$h_3 = \frac{\Phi_L + \Phi_R}{2} \qquad 2$$

These approximate the pan 112 and tilt 114 angles respectively of a line coming out of the midpoint between the eye cameras 120 & 140 and going straight to the target 130. The eye camera 120 & 140 angles used in this calculation are those when the eye cameras 120 & 140 are looking directly at the target, i.e. the pixel coordinates are zero. $h_1$ and $h_3$ will have the same meaning as the eye camera angles 124, 126, 144, 146 and with the same references, ie if $h_1$=0, the target is on a line originating halfway between the eye cameras 120 & 140 and perpendicular to the head 110. While this makes up part of the information needed to represent the target's location, there are still infinitely many points on this line where the target 130 could reside. To represent the distance of the target from the robot, the HCC 630 is populated with a representation of the vergence angle. That is, the angle at which the central focus of the two eyes converge. Thus, $h_5$ and $h_7$ represent the horizontal and vertical vergence, respectively, and they are computed as follows.

$$h_5 = \frac{\Theta_L + \Theta_R}{2} \qquad 3$$

$$h_7 = \frac{\Phi_L + \Phi_R}{2} \qquad 4$$

The divisor in the equations for $h_1, h_3, h_5$ and $h_7$ is 2 because of the symmetry of the eye cameras 120 & 140 relative to the "nose" 102 of the head 110. Other locations of eye cameras 120 & 140 may result in the divisor being other than two. Hence in general, the components of HCC 630 are a function of the eye camera 120 & 140 pan and tilt angles 124, 144, 126, 146 as appropriate for the geometry.

Body Centered Coordinates

The third level in the core representation hierarchy is Body Centered Coordinates (BCC), which is based on the head position and eye vergence necessary to center the target in both eye cameras while the eye cameras 120 & 140 are looking straight ahead. It is easy to compute the BCC 650 of a target 130 if both eye cameras 120 & 140 are looking at the target 130 and a line coming straight out of the midpoint between the eye camera 120 & 140 intersects the target 130. Recall that a line originating from the midpoint between the eye cameras 120 & 140 defines $h_1$ and $h_3$. Thus, one can directly compute the BCC 650 of a target if both eye cameras 120 & 140 are looking at it, $h_1$=0 and $h_3$=0. Like HCC 630, BCC 650 is represented by a four-element vector B=⟨$b_1, b_3, b_5, b_7$⟩. Let $\Theta_H$ and $\Phi_H$ be the head joint's pan 112 and tilt 114, respectively. Assuming that the target 130 is centered in both eye cameras 120 & 140, $h_1$=0, and $h_3$=0, the BCC 650 is computed as follows.

$$b_1 = \Theta_H \qquad 5$$

$$b_3 = \Phi_H \qquad 6$$

$$b_5 = h_5 \qquad 7$$

$$b_7 = h_7 \qquad 8$$

Notice that $b_1$ and $b_3$ are the head commands/angles needed so that the eye cameras 120 & 140 can center the target while $h_1$=0, and $h_3$=0. Also, $b_5$ and $b_7$ are the same as $h_5$ and $h_7$, because the vergence angle and distance to the target 130 are substantially the same, regardless of the head 110 position.

The equations given above tell one how to compute the BCC 650 of a target 130 when it is directly in front of the robots "face".

Hierarchical Spatial Working Memory (HSWM) for a Target

FIG. 6 shows a schematic of the hierarchical structure of the Hierarchical Spatial Working Memory 600 as it would be represented in a computer. Each target is represented by a set of Eye Centered Coordinates (ECC) 610, a set of Head Centered Coordinates (HCC) 630 and a set of Body Centered Coordinates (BCC) 650. In addition, the current position of the eye cameras 660 and head 670 are saved. A mapping function 620 is needed for converting ECC to HCC and another mapping 640 to convert HCC to BCC. Since only one mapping 620 is needed for ECC to HCC and another 640 from HCC to BCC, these mappings do not have to be saved with each target. One skilled in the art will appreciate that the various data elements do not have to be stored in contiguous memory as long as any program needing the data can access it. Moreover, a person skilled in the art will realize that alternative robot configurations and designs may call for more or fewer coordinate representations and mappings.

The Hierarchical Spatial Working Memory 600, shown in FIG. 6 is a visual core representation hierarchy that encodes the location of a target in space in multiple coordinate representations and in terms of a camera sensor's required commands or orientation such that the target is centered in the camera images. Given a target in the field of view of the eye cameras, the HSWM may be populated first with the current pixel values, then the eye cameras 120 & 140 are moved such that the pixel values are zero. The last pan 124, 144 and tilt 126, 146 angles become the arguments for the HCC. Alternatively, if the mappings from eye centered coordinates to head centered coordinates (hmap 620) and from head centered coordinates to body centered coordinates (bmap 640) are known then the target position in head and body centered coordinates may be computed.

The HSWM 600 may be thought of as accommodating an active vision robot 100 with two independent eye cameras 120 & 140 on a movable head 110. The visual core of this multimodal hierarchy are the eye and head positions necessary to center a target 130 in the eye cameras 120 & 140. The head positions are those necessary to point the "nose" at the target. This is captured in the BCC 650.

Mapping from Eye Centered Coordinates to Head Centered Coordinates

While the equations given above are sufficient to calculate the HCC 630 representation of a target 130 centered in the field of view of each eye camera 120, 140 of the robot 100, converting a visual saliency map from pixel space to HCC requires an ability to find the HCC 630 of each pixel in an eye camera 120, 140. hmap 620 provides the mapping to convert any target 130 in the field of view of the robot's eye cameras 120 & 140 or each pixel to HCC 630. Let E be the ECC 610 representation of the target or pixel, H is the HCC 630 representation of the currently foveated point, and $\hat{H}$ is the HCC representation of $\hat{E}$ to be computed. The mapping hmap 620 (head-centered map in FIG. 6) is used to compute the HCC 630 representation of the target or pixel.

$$\hat{H} = h\mathrm{map}(\hat{E}) + H \qquad 9$$

hmap may be learned through a training scenario or its equivalent. Given hmap, a point with a known ECC, and HCC of the current foveated point, then each pixel in the field of view of a camera can be converted into equivalent HCC coordinates.

Generally, before the creation of a visual saliency map begins, the calibration of the mapping from ECC to HCC must be performed. While the determination of the mapping could occur after the saliency map is developed, it must be determined before the saliency map can be converted to HCC coordinates.

Mapping from Head Centered Coordinates to Body Centered Coordinates

Similar to the preceding paragraph, the mapping bmap 640 will generate the body centered coordinate BCC 650 of a target 130 for a given head centered coordinate HCC 630, as shown in FIG. 6. Given HCC 630 and bmap, BCC 650 is computed as follows: Let $\hat{H}$ be the HCC 630 of the new target 130, let B be the BCC 650 of the current position, and let $\hat{B}$ be the BCC representation of the new target 130. $\Theta_H$ and $\Phi_H$ are the pan 112 and tilt 114 angles respectively of the current head position and assumed independent. The mapping, bmap 640 (body-centered map in FIG. 6), gives the values needed.

$$\hat{B} = b\mathrm{map}(\hat{H}, \Theta_H, \Phi_H) + B \qquad 10$$

Auditory Extensions to the Hierarchy

While the Hierarchical Spatial Working Memory 600 shown in FIG. 6 is constructed and interpreted in terms of visual inputs and commands required to visually center a target, it can be extended to incorporate auditory data from microphones acting as "ears". FIG. 1 shows the robot head with four microphones 170, 175, 180 and 185 acting as "ears". Microphones 170 and 175 can be used to determine the azimuth angle of a target from the difference in arrival times of the same noise signal. Likewise, the elevation angle of the noise source can be determined from the difference in arrival times of the same noise signal in microphones 180 and 185.

Integrating the microphones into the HSWM requires developing azimuth and elevation angles indicating the source of the auditory target comparable to the head pan 112 and tilt angles 114 indicating the source of the visual target

Saliency Maps

Visual Saliency Map

Humans can analyze a scene quickly and easily, effortlessly noticing objects, even those that the viewer has never seen before. "Noticing" the object is an example of computing the saliency of the object and can occur before the object is identified. As important, the saliency of the object depends on the system goals. Neurologically, saliency occurs as a front-end to perception, prior to conscious registration of the event. Having a computer process an image into the specific regions that are of highest interest in the context of system goals is computing the saliency map for the system. Implicit in this description is the concept that as the system goals change the saliency map may change. For example, if the system goal is to pick up a particular colored object then an object with a color that matches the desired color will have greater saliency than non-matching colors. Once the object is grasped then the goal may change to orient the object with respect to another. The color of the object no longer creates the greatest saliency. Instead, identification of particular shapes of the object to facilitate orientation becomes more important and the saliency computation is adjusted accordingly.

As shown in FIG. 10, there are two main classes of saliency algorithms each with two approaches to computation. The two main classes are feature-based and object-based algorithms. Feature-based methods, are described in [10-12]; they are well established and widely referenced. These references compute attention by constructing a saliency map from a set of biologically inspired features extracted from the image such as intensity, color or orientation. The feature-based method breaks apart the image into a set of Gaussian pyramids corresponding to, for example, color, intensity, and orientation at a series of scales, which are combined across scales and these features are then merged into the saliency map. The system attends to the point that corresponds to the maximum value in the saliency map, executes some processing relevant to that location, and shifts to the next most salient point. However, this method does not give object boundaries, but only gives the most salient locations in the scene, which may or may not fall inside an object boundary. In order to overcome these limitations of feature-based methods, object-based methods have been proposed and developed [13, 14]. HRL Laboratories LLC has previously described an object-based visual saliency method that finds the most salient objects and their boundaries (or segmentation) in "Visual Attention and Segmentation System" patent application Ser. No. 12/214,259 filed 16 Jun. 2008. A visual saliency map generated using HRL's object-based attention algorithm may be used in step 510 in FIG. 5A. The object based saliency calculation is detailed in FIG. 7.

The visual saliency map is determined by first commanding the robot 100 to foveate on a known target for which the ECC and HCC are known as in step 720 in FIG. 7. The known target is from the Initial List of Stare Points in the Robot Control Plan 504 shown in FIG. 9. Since the target is known a priori, the ECC, HCC and BCC for the target will be known too. Without moving the eye cameras 120, 140 the computer 200 will store the image in the eye camera 120, per step 730. At this stage the robot has a single image in pixel coordinates. The ECC representation requires the left and right pixel coordinates for each point in the image.

Complete the ECC representation 610 for each pixel per step 730 in FIG. 7. Let one image be the principal image (e.g. the left eye camera 140). Concurrent with capturing the principal eye camera image, capture the other eye camera image (e.g. the right eye camera 120). The principal and other eye camera images are compared with normalized cross correlation to determine the pixel values in the other camera for each point in the principal camera. The result is an image from the principal eye camera with known coordinates for each point in left and right eye camera 120, 140 coordinates. This coordinate representation is the Eye Centered Coordinates 610 of FIG. 6. If the correlation is less than the user defined threshold in the Robot Control Plan 504 then there is no correlation and no pixels in the other camera image to complete the ECC. One consequence is the robot control 500 will apply to targets that appear in both eye cameras 120, 140 or that can be brought into the field of view of both eye cameras 120, 140.

Note that the preceding reference to image is used without limitation in that the image could be in color, Black & White, infrared, millimeter wave or some other image as a function of pixel location. At this point the computer has an image stored in ECC coordinates. The saliency map is computed according to the method detailed in the following paragraphs.

The bio-inspired attention and object segmentation system 700 processing of the principal eye camera image for saliency is continued in FIG. 7, steps 740 to 760. The object based saliency calculation is comprised of the following modules and methods: feature extraction 742, feature edge detection 744, watershed computation 746, Figure-Ground separation 748, object based saliency calculation 749.

The feature extraction module 742 may use, for example, six features including two intensity channels, L and D (light and dark), and four fully-saturated color channels (red (R), green (G), blue (B), and yellow (Y)). The two intensity channels, L and D, are calculated from the input image by averaging the red (r), green (g), and blue (b) channels: L=(r+g+b)/3 and D=255−L. Four fully-saturated color channels are created (red (R), green (G), blue (B), and yellow (Y)) that yield zero-response to white, effectively separating the effects of the color and intensity channels:

$$R = r - \frac{(g+b)}{2}, \quad G = g - \frac{(r+b)}{2},$$
$$B = b - \frac{(r+g)}{2}, \quad \text{and} \quad Y = \frac{(r+g)}{2} - \frac{(r-g)}{2} - b. \qquad 11$$

All negative values are thresholded at zero. Feature opponency maps corresponding to the receptive fields in the retina for red-center/green surround, green-center/red-surround, blue-center/yellow-surround, bright-center/dark-surround, and dark-center/bright-surround are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

The feature edge detection module 744 computes the gradient information of each opponency map by convolving it with a filter (such as a Sobel filter), which extracts the edge information from each map. A master edge map, E, is computed by representing each pixel (x, y) by its maximum value across all of the edge maps in a winner-take-all fashion often exhibited by neural cells:

$$E(x,y) = \max\{E_{RG}(x,y), E_{GR}(x,y), E_{BY}(x,y), E_{YB}(e,y),$$
$$E_{LD}(x,y), E_{DL}(x,y)\} \qquad 12$$

The master edge map is processed by a watershed algorithm (i.e., watershed module 746), which completes the boundaries and closes the contours provided by the edge map and represents these regions as segmented proto-objects. According to research, the phase differences between neighboring visual cortical neurons are believed to contribute to the segmentation of objects in a scene and perceptual grouping of "blobs". The watershed transform simulates these activities. Figure-ground separation is achieved by tagging those watershed regions that occupy a disproportionately large region of the image space as "background" and all others as foreground proto-objects. Segmented proto-objects that only occupy a small fraction of the scene (e.g., <2%) are discounted as noise.

Once the scene has been segmented into a grouping of proto-objects, the saliency calculation 749 follows, in which the saliency of each is computed and ranked relative to the other proto-objects in the image. For any given proto-object, the local neighborhood is represented by a rectangular bounding box surrounding the object whose area is three times larger than the object. The bottom-up saliency ($S_{BU}$) of a given proto-object is defined as:

$$S_{BU} = \sqrt{\sum_i (\Delta FEAT_i)^2}, \qquad 13$$

where the contrast term $\Delta FEAT_i$ for the $i^{th}$ feature is computed as the difference between the average feature value within the object boundary and the average feature value of the object surround:

$$\Delta FEAT_i = \max\left(w_i\left(\left\langle FEAT_i\right\rangle_{object} - \left\langle FEAT_i\right\rangle_{surround}\right), 0\right). \qquad 14$$

The angle brackets indicate the average operator over the pixels within the indicated region. Therefore, $\langle FEAT_i\rangle$ is the average value of the feature collected (e.g. average pixel value of the red-center/green surround channels) within the boundary of the proto-object or the surrounding area. The value of w determines the weight of the $i^{th}$ feature and is the principle component of the top-down biasing mechanism of the system.

Once the feature based saliency is computed, per FIG. 10 the object based saliency may be computed by adding the results from sobel, watershed and other filters per "Visual Attention and Object Recognition System" application Ser. No. 11/973,161 filed 4 Oct., 2007.

Finally, given the saliency map in ECC coordinates map each pixel to HCC coordinates per step 760 in FIG. 7 using the hmap and equation 9. The mapping from ECC to HCC is determined separately. Map each HCC coordinate of saliency to BCC using bmap per equation 10. The result is the visual saliency map converted into BCC coordinates of azimuth 112 and elevation 114. Note that equation 9 requires the currently foveated point for H, hence the eye positions are known, and equation 10 requires the current head position. These elements make up the Hierarchical Spatial Working Memory and are available for further processing.

Auditory Saliency Map
FTC Coordinates

FIG. 8 shows the method for computing the auditory saliency map from a microphone 170, 175, 180 or 185. This method is analogous to the visual saliency map in "Visual Attention and Segmentation System" Ser. No. 12/214,259 filed Jun. 16, 2008. The first step 810 is recording the microphone outputs and selecting one for processing into a saliency map. The recording may be of signal amplitude (loudness) versus time. Next, in step 820, windows of auditory data in the time domain are converted into the frequency domain with a short-time Fourier transform (STFT). Each window is centered at a time step. The result is auditory intensity versus frequency and time (i.e., a spectrogram) in Frequency versus Time coordinates (FTC). The spectrogram is used as the input to step 830 that creates the auditory saliency map.

In step 830 the segregation of individual features based on spectral or temporal modulation is accomplished by determining three conspicuity maps from the frequency versus time spectrogram corresponding to sound intensity, frequency contrast, and temporal contrast. Each conspicuity map is the normalized result of a two dimensional convolution of the FTC spectrogram with a filter. The filter for the intensity conspicuity map is a single Gaussian filter that emphasizes loud noises and smoothes the FTC spectrogram. The frequency conspicuity map uses a filter with a strong positive Gaussian filter in the pass band region and two negative Gaussian filters on either side of the pass band, one for the lower frequency sideband and the other for the upper frequency sideband. The filter for the temporal conspicuity map uses a strong positive Gaussian filter centered at a slightly greater time than the desired overall center time and another weaker negative Gaussian filter centered at a lower time then the overall center time. Per step 840, normalization employs an asymmetric sliding window that rectifies and thresholds each conspicuity map to a value between zero and one.

Finally, per step 850, the individual conspicuity maps are linearly combined and normalized. The resulting map is saliency in frequency-time coordinate system (FTC).

The auditory saliency map indicates frequencies and timeframes that might be of particular interest to the robot. However, the saliency information alone is not particularly useful for pinpointing the location of its origin. Rather, the saliency information is combined with information provided by the microphone array to localize the source of the sound and convert its saliency into the HCC or BCC coordinate system. This requires that the source of the sound be localized relative to the robot. FIGS. 11A and 11B show the method of localizing the sound source.

Segment Auditory Data to Localize Sources in Frequency Versus Time

Auditory stimuli of interest are segmented within the auditory saliency map using a rectangular window centered at a saliency peak, with the boundaries of the rectangle chosen in each direction such that saliency values greater than 90 to 95% of the peak are included or a saddle point between adjacent peaks is reached. This segmentation per step 1110 defines a start and stop time and a start and stop frequency for each salient point. The start and stop times may be reduced and increased respectively by the expected maximum interaural time difference. The start and stop times can be used to extract the salient sound snippets from the original auditory stream at each microphone for further processing. The snippet of auditory data extracted from the recording based on the start and stop times is further filtered in the frequency domain based on the start and stop values of the frequency band. Depending on the bandwidth of the salient region, these snippets can be subjected to further processing and filtering to eliminate the noise at uninteresting frequencies (1130). Further processing to ensure a clean signal may be a useful additional step to accurate localization of a sound. In addition, if two salient sounds at different frequencies occur simultaneously then they must be filtered and split into separate signals prior to localization to ensure accurate determination of their sources.

Segmentation of two simultaneous sound sources is accomplished by first assuming the two sources are of different frequencies. If the two sound sources overlap in both time and frequency then the method herein will treat the two or more sources as one. Furthermore, if the two sound sources are distinct in time then the segmentation method based on a rectangular window centered at the peak in the saliency map will suffice. If the two sound sources overlap in time but are distinct in frequency then the windowing method will identify the start and stop times, and the upper and lower frequency of each peak. Once the start and stop times and the frequency boundaries of the peaks are known, the microphone signals can be processed to extract the particular time window, which can then be further filtered with a band pass filter whose frequency boundaries correspond to the lower and upper frequencies of the window centered on the salient peaks.

Although the auditory saliency map is computed from one microphone's signal, the time and frequency windows are applicable to each microphone's 170, 175, 180 and 185 recorded signal. Each of the four microphone signals is segmented into snippets of the auditory signal with common time and frequency bands from step 1110. Each set of snippets for a given time and frequency band or salient point can be processed for the location of the sound source per the method shown in FIGS. 11A and 11B.

Localization

The location of the source of the sound is determined by computing the interaural time difference (ITD) between two microphones for a pair of snippets of the auditory signal identified in the segmentation method above. The upper and lower microphone's 180, 185 recorded auditory snippets are used to compute the elevation. The left and right microphone 170, 175 recorded auditory signals are used to compute the azimuth. Research has shown that this method is best employed for mid to high frequency sounds above 500 Hz [7]. First the four auditory signals are filtered in time and frequency per step 1120 for each saliency identified in 1110. The result is four snippets of sound for each salient point in 1110. Next, the auditory snippets are filtered to remove echoes, various noise sources, and other anomalies in step 1130. Next, it is useful to decimate the auditory signal at each microphone into a rectified series of weighted Kronecker delta functions that correspond to amplitude increases in the signal envelope (at each of the so-called "onsets" of sound [8]). Rectified as used here means negative values are discarded. In FIG. 11A this is step 1140 and 1150. An important element in the process step 1150 is inhibiting the occurrence of a Kronecker delta function until approximately 10 milliseconds have elapsed from the occurrence of the immediately preceding Kronecker delta function. This feature mimics the performance of the human brain which filters out echoes from loud signals by waiting some time after a loud signal before considering the next. From the series of Kronecker delta functions or onset signals, one can compute the ITD and the corresponding azimuth angle 112 in step 1160 by cross correlating pairs of onset signals. The cross-correlation function indicates how far apart two signals are shifted in time. The ITD is the time corresponding to the largest peak from the cross-correlation between the left and right microphones 170, 175 series of Kronecker delta functions or onset signals. The azimuth of the sound source can be computed by solving 15 or 16, in step 1180 depending on the configuration of the ears relative to the head. The elevation angle is computed similarly in steps 1170, 1180.

$$ITD = \frac{d}{2S}\sin(\theta) \quad\quad 15$$

$$ITD = \frac{d}{2S}(\theta + \sin(\theta)) \quad\quad 16$$

for θ (in radians), where S represents the speed of sound (344 m/s), and d corresponds to the linear distance (in meters) between the microphones 170 and 175, or 180, 185 [9]. Equation 15 is for the head in FIG. 1 where the microphones 170, 175, 180 and 185 are in the same plane as the eye cameras 120, 140. Equation 16 is used where the head has a spherical shape of radius d/2. The elevation angle 114 may be computed by solving the above equation for θ, where the ITD is determined from the upper and lower microphone 180, 185 recorded auditory snippets. This information is used to produce a map in HCC that indicates the azimuth 112 and elevation 114 angles required to point the head 110 of the robot 100 at the location of the origin of the sound.

Ideally, the cross-correlation function will return a single, sharp peak. However, due to various sources of noise, this function will often return a series of peaks, which correspond to the relative confidences that the sound originated at a given location. The origin of the sound is identified as follows. If the cross correlation has one major peak then the time of occurrence of that peak is the ITD. A major peak is one with an amplitude greater than a user defined multiple of any other peak in the cross correlation. Typically the major peak has an amplitude more than twice that of the next largest peak. Given the ITD of the major peak, one can identify the source of the sound as the source that occurs earliest, providing that source is loudest. However, if the cross correlation contains two or more distinct peaks then one of the peaks may be an echo or the result of noise within the pass band. Anomalies such as these are detected and ignored by comparing the amplitudes and timings of the first onset from each microphone. If the amplitude of the first onset is larger in the microphone that first recorded the onset sound, then the range of possible angles for the origination of the sound is constrained to that side. Otherwise, the auditory snippet with the larger amplitude at the time of the largest peak is selected as being the recording of the original sound.

In instances where there is only a two microphone array then some simplifications are necessary. A two-microphone array (170, 175 for example) cannot simultaneously detect both the azimuth and elevation of the location of a sound source. In these instances, there will always be a certain degree of uncertainty associated with the missing coordinate; for example if microphones 180, 185 are absent then it is useful to assume that the most likely elevation 114 of the sound is at eye level (elevation equals zero), with a certain degree of uncertainty in this dimension that decreases as the tilt 114 tends away from its zero value. The azimuth 112 values in this map along zero elevation are determined from the peak times from the cross-correlation between the right and left microphones 170, 175.

Once the source (azimuth and elevation) of each segmented peak in the auditory saliency map has been determined, one can use this information to transform the saliency map from the frequency-time coordinate system into an auditory HCC saliency map that combines the saliency and localization information. This is performed by placing a Gaussian peak in the BCC coordinate space (azimuth 160 and elevation 150) at the location of each peak in the saliency map per step 1190 of FIG. 11B. Each of these Gaussians is given the height of the corresponding peak in the frequency-time saliency map. This ensures that the locations corresponding to salient noises will be attended to with a higher preference than sounds with low saliency, as long as the sounds occur within the same time frame. The new BCC auditory saliency map is normalized to the range between zero and one and is then forwarded to the multimodal fusion stage per step 1195.

Top Down versus Bottom Up Saliency

The preceding description of saliency computation was predicated on the Robot Control Plan, see FIG. 9, directing the robot to focus on particular targets as expressed as robot sensor position commands. This is considered a Bottom-Up approach in that all the parameters needed to focus on a target are provided as inputs.

An alternative method of computing saliency starts with the Robot Control Plan containing instructions to execute various training scenarios that teach the robot controller the various weighting factors. This Top-Down method requires the Robot Control Plan in FIG. 9 to contain the directions, training scenarios and robot commands where the robot will look. These training scenarios have the robot foveate on known, contrived targets with known features.

In top-down biasing, each feature of an object is assigned a given weight, which allows one to manipulate the importance of each feature for the saliency calculation 406. This contrasts with the bottom-up case where the feature weights are set to a default value or an a priori value. In the top-down case, the proper feature weights to attend to the features of a given target are computed using a separate module than the attention module. The training algorithm takes a series of target images and masks from a training set as its input. Each image may be the product of a watershed algorithm. The watershed algorithm will segment the image into regions with a common feature value. The image is masked to show only the object of interest. That object will have a range of feature values. The mean and standard deviation of the feature within the mask for the object is used to bias the default weighting factors. The weight of each feature, $w_i$, is computed as the relevance of the feature based on the mean, $u_i$, and standard deviation, $\sigma_i$, of the occurrence of the feature:

$$w_i = w_0 \frac{u_i}{1+\sigma_i}, \qquad 17$$

where $w_0$ represents the default (bottom-up) weight for a given feature. The algorithm ensures that features common to all items in the training set will be given a preference over those that are less common, which can be caused by lighting and other visual anomalies. Similarly, biasing for distinct features that exist in a specific target greatly increases the probability that the attention system will attend to that specific target prior to any other objects in a scene.

In the top-down biasing of an object, specific feature cues are used so that objects containing that feature draw more attention. Executing the system in a top-down manner can allow it to process scenes faster, if such cues are available. For example, if one wishes to tune the system to detect red cars in a given scene, it will use this information to make red objects more salient than if bottom-up mode were run.

Fusing Saliency Maps

Per step 1210 of FIG. 12, the mappings for auditory and visual saliency have been transformed into a common coordinate system BCC 650. The saliency maps describe the locations of interest at a given time, but they must be combined into a fused saliency map which balances the robot's attention between objects that "stand out" in a visual scene with sounds that attract interest. This process is carried out using a weighted linear combination of the visual and the auditory BCC saliency maps as shown in FIG. 12. The weighted maps are added on a point-by-point basis 1220, and the final saliency map is normalized to the range between zero and one 1230. At this stage 1230, the final map represents the BCC coordinates of salient regions for both visual and auditory stimuli, and allows the robot to fixate its attention on the most salient object in its environment. The most salient objects in the environment depend on the weights assigned to the various components of the saliency map as well as the weights used in the final fusing. These weights are not necessarily constant and may vary with the goals of the control method at a particular time.

The elements of saliency based on visual data have a complete HSWM available because the image was taken based on a target in the Initial List of Stare Points. Each of these targets is known a priori, hence the ECC, HCC and BCC are known for each target in the Initial List of Stare Points. The components of saliency based on auditory data will not have a complete HSWM because the audio source may have been outside the field of view of the eye cameras 120, 140. This will affect the robot control, as described in FIG. 5B, when the targets are selected.

Prioritization of Targets, Completing HSWM, Focusing on Targets

Add Urgency Values to Targets

Targets derived from the saliency map can be prioritized by their saliency into a queue of targets 528. The position of a target in the queue represents the urgency of that target and may reflect not only the saliency but other information such as whether the target is moving, has been previously foveated, or is new 534.

Adjust Urgency Values Based on Focusing of Targets

Optionally, given that the urgency of a target is its position or priority in the queue of targets, one can adjust the urgency based on information not readily derived from the saliency map. A saliency map does not take into account prior saliency maps. Hence a target in motion would not necessarily have a different saliency in a later map compared to a more recent map. Yet adjusting the urgency based on this sort of information per step 534 may be essential to accomplishing the goals in the Robot Control Plan For example, the Robot Control Plan may have as a goal the detection of intruders. Depending on the weighting factors used to compute the feature based or object based saliency, a target's motion may not affect the saliency and hence its urgency. An urgency adjustment module 534 will compute adjustments in urgency based on the change in a target's saliency with time or other attribute such as position or size.

Predicting Target Locations

Optionally, the urgency or priority of a target may be adjusted based on the time history of the saliency (size, brightness, color) or some other attribute that varies with time such as position or range.

Complete HSWM of Targets Based on Auditory Data

The preceding section provides a saliency map as a function of azimuth 160 and elevation 150. From the most salient regions, now identified as targets, the azimuth 160 and elevation 150 can be used as initial values to determine the first two components of BCC 650 of the HSWM for that target. However, the complete BCC 650 requires the robot foveate on targets to determine a measure of distance; this is done in step 550 of FIG. 5B.

These last two components of BCC 650 are the vergence angles of the eye cameras 120 and 140 when the eye cameras 120 and 140 are foveating on the target. Depending on the distance from the head to the target, the eye camera angles will change and the last two components of BCC 650 will change.

Because the boundaries of the principal image used to compute visual saliency are known, any salient target can be checked against those boundaries to detect an incomplete HSWM for that target, as shown in step 551 of FIG. 5B. Targets within the boundaries are within the field of view and may be foveated directly, as shown in step 558 of FIG. 5B.

If the target location is not within the field of view of the eye cameras 120, 140 then the head 110 and eye cameras 120, 140 may be moved per step 552 to place the target 130 in the field of view of the eye cameras 120, 140. The head 110 is commanded to point in the direction defined by the azimuth 160 and elevation angles 150 in the BCC 650 representation of the target.

With the target now in the field of view of the eye cameras 120 and 140, a new visual saliency map may be computed per step 553. The most salient point may be identified and this new visual saliency map fused with the existing auditory saliency map as described previously and referenced in step 518 and 554. Since the auditory source previously outside the field of view is now within the field of view, the complete HSWM may be built per step 556 and the robot commanded to foveate on the salient auditory source per step 557 of FIG. 5B.

Dynamic Adjustment of Robot Control

Adjust Saliency Computation Based on Previously Foveated Targets

Once targets have been foveated, succeeding saliency calculations may be adjusted when the same target presents itself again 540. For example, fusing the results of feature calculations or calculating the object based saliency—for a range of pixels predicated on the past location of an object previously known to contain a salient object 540—may be omitted to allow alternative processing for some other attribute or skipped; the prior saliency is reused instead of recalculated.

Adjust Saliency Computation Based on Predicted Target Locations

Saliency calculations can be adjusted not only based on previously foveated targets but also on the time history of a target per step 532. If a high saliency target can be tracked from one range of pixels to another then the saliency for the target in the new range of pixels can reasonably be set at the saliency of the target in the old range of pixels.

Given the combined, fused saliency map in azimuth 112 and elevation 114 coordinates, select the azimuth and elevation coordinates of the largest/most salient point. Generate commands to the robot 100 to point the head 110 at the salient point. This is accomplished by the robot 100 issuing the selected azimuth 112 and elevation 114 angles as commands 222.

Robot Control Plan

FIG. 9 shows the contents of the robot control plan. This list is not meant to be limiting or exhaustive but representative of the contents of a robot control plan of the present disclosure. The plan contains the a priori configuration parameters needed to compute the auditory saliency map, the training scenarios needed to determine bmap, hmap and the various weighting factors for computing saliency and fusing the maps. In addition, the plan 504 may contain a "Maximum Number of Salient Points in Prioritized Target List 528" to limit the number of salient points in the list of Prioritized Targets 528, an "Initial List of Stare Points" the plan may use to initialize the robot configuration and the visual data for the first saliency map, a "List of Objects to be Considered Targets" to limit the number of objects extracted from the object based saliency method (if elected), and a "List of Objects to be Ignored" by the object based saliency method.

Robot Control

The actual, physical control of the robot is a hardware dependent function outside the scope of this application. The disclosure herein provides the commanded positions that are sent to the robot control hardware. The robot control hardware may command the robot based on open loop or closed loop control.

What is claimed is:

1. A computer program product for controlling a robot, the computer program product comprising a non-transitory computer-readable medium having computer program instructions stored therein for causing at least one computer to perform operations of:
   controlling the robot to acquire sensor data;
   computing one or more saliency maps from the sensor data based on a robot control plan;
   fusing the one or more saliency maps into one combined saliency map;
   creating a list in hierarchical spatial working memory of one or more targets according to the robot control plan from the combined saliency map;
   prioritizing the targets in the hierarchical spatial working memory according to the robot control plan; and
   commanding the robot to focus on the targets in order of priority:
   wherein the hierarchical spatial working memory represents each target as a set of Eye Centered Coordinates, a set of Head Centered Coordinates, a set of Body Centered Coordinates, a set of current Eye Camera positions and a set of current Head positions.

2. The computer program product of claim 1 wherein the computer program instructions stored therein for computing one or more saliency maps further comprises instructions for computing at least one feature based saliency map.

3. The computer program product of claim 2 wherein the instructions for computing the saliency maps further comprises instructions to compute at least one object based saliency map.

4. The computer program product of claim 2 wherein the instructions for computing the saliency maps further comprises instructions to compute at least one auditory saliency map.

5. The computer program product of claim 1 wherein the instructions for computing one or more saliency maps further comprises instructions for modifying the one or more saliency maps according to an identification of one or more targets.

6. The computer program product of claim 1 wherein the instructions for computing one or more saliency maps further comprises instructions for modifying the one or more saliency maps according to predicted positions of one or more targets.

7. A system for robot control comprising:
   a robot control plan, a first eye camera, a second eye camera, at least a left auditory sensor and a right auditory sensor, all mounted on a robot and all providing data to at least one computer;
   the at least one computer programmed to execute instructions stored on a computer readable medium for causing the computer to perform operations of:
   receive said first eye camera, second eye camera, left and right auditory sensors, upper and lower auditory sensors data;
   compute a visual saliency map from the first eye camera and second eye camera data in the head centered coordinate system;
   compute an auditory saliency map in body centered coordinates from the auditory sensor data;
   fuse the visual and auditory saliency maps according to a weighting function;
   derive a list of targets from the fused saliency map and store them in hierarchical spatial working memory;
   prioritize the list of targets according to the contents of the robot control plan; and
   command the robot to focus on the targets in priority order;
   wherein the hierarchical spatial working memory represents each target as a set of Eye Centered Coordinates, a set of Head Centered Coordinates, a set of Body Centered Coordinates, a set of current Eye Camera positions and a set of current Head positions.

8. The system for robot control of claim 7 wherein the computer readable medium further comprises instructions therein for causing the computer to command the robot to focus on salient objects as determined by computer program inputs.

9. The system for robot control of claim 7 wherein the computer readable medium further comprises instructions stored therein for causing the computer to compute the auditory saliency map by performing operations of:
   computing a second saliency map in frequency versus time coordinates from data generated by said auditory sensors;
   determining a frequency and time band for each salient point of the second saliency map;
   extracting a snippet of sound from each auditory sensor based on the frequency and time band for each salient peak;
   filtering the snippets of sound to remove echoes and noise;
   reducing each filtered snippet of sound into an onset envelope signal;
   converting the onset envelope to a series of weighted Kronecker delta functions;
   calculating an azimuth Interaural Time Difference by cross correlating corresponding weighted Kronecker delta functions for each salient peak;
   calculating an azimuth angle for each salient peak from the azimuth Interaural Time Difference;
   calculating an elevation Interaural Time Difference by cross correlating corresponding weighted Kronecker delta functions;
   calculating an elevation angle for each salient peak from the elevation Interaural Time Difference.
   constructing an auditory saliency map in azimuth-elevation coordinates by assigning the largest auditory sensor signal for each salient peak to a weighted distribution centered at the previously calculated azimuth and elevation with a standard deviation.

10. A method of controlling a robot comprising acts of:
    receiving visual sensory data;
    receiving auditory sensory data;
    receiving a control plan for the robot;
    calculating a saliency map according to the control plan;
    computing a list of targets in Hierarchical Spatial Working Memory from the saliency map;
    prioritizing the list of targets according to the robot control plan;
    controlling the robot by commanding the robot to focus on the targets in order of priority:
    wherein the Hierarchical Spatial Working Memory represents each target as a set of Eye Centered Coordinates, a set of Head Centered Coordinates, a set of Body Centered Coordinates, a set of current Eye Camera positions and a set of current Head positions.

11. The method of controlling a robot of claim 10 wherein calculating the saliency map further comprises acts of:
    computing the visual saliency map in head centered coordinates from visual data according to the control plan;

computing the auditory saliency map in body centered coordinates from data generated by auditory sensors according to the control plan;

combining the visual and auditory saliency map according to the control plan.

12. The method of claim 10 wherein the method of computing the visual saliency map uses object based segmentation.

13. The method of claim 10 wherein the method of computing the visual saliency map uses feature based segmentation.

14. The method of claim 10 wherein the method of computing the auditory saliency map comprises:

computing a saliency map in frequency versus time coordinates from data generated by auditory sensors;

determining the frequency and time band for each salient point of the saliency map;

extracting a snippet of sound from each auditory sensor based on the frequency and time band;

filtering the snippets of sound to remove echoes and noise;

reducing each filtered snippet of sound into an onset envelope signal;

converting the onset envelope to a series of weighted Kronecker delta functions;

calculating an azimuth Interaural Time Difference by cross correlating corresponding weighted Kronecker Delta functions for each salient peak;

calculating an azimuth angle for each salient peak from the azimuth Interaural Time Differences;

calculating an elevation Interaural Time Difference by cross correlating corresponding weighted Kronecker Delta functions for each salient peak;

calculating an elevation angle for each salient peak from the elevation Interaural Time Difference;

constructing an auditory saliency map in azimuth-elevation coordinates by assigning the largest auditory sensor signal for each salient peak to a weighted distribution centered at the previously calculated azimuth and elevation with a standard deviation.

15. At least one computer programmed to execute a process for controlling a robot, the process comprising:

receiving visual sensory data;

receiving auditory sensory data;

receiving a control plan for the robot;

calculating a saliency map according to the control plan;

computing a list of targets in Hierarchical Spatial Working Memory from the saliency map;

prioritizing the list of targets according to the robot control plan;

controlling the robot by commanding the robot to focus in order of priority on the targets:

wherein the Hierarchical Spatial Working Memory represents each target as a set of Eye Centered Coordinates, a set of Head Centered Coordinates, a set of Body Centered Coordinates, a set of current Eye Camera positions and a set of current Head positions.

16. The at least one computer programmed to execute a process of claim 15 wherein calculating the saliency map further comprises acts of:

computing the visual saliency map in head centered coordinates from visual data according to the control plan;

computing the auditory saliency map in head centered coordinates from data generated by auditory sensors according to the control plan;

combining the visual and auditory saliency map according to the control plan.

17. The at least one computer programmed to execute a process of claim 15 wherein the process of computing the visual saliency map uses object based segmentation.

18. The at least one computer programmed to execute a process of claim 15 wherein the process of computing the visual saliency map uses feature based segmentation.

* * * * *